(12) United States Patent
Wines et al.

(10) Patent No.: US 7,891,952 B2
(45) Date of Patent: Feb. 22, 2011

(54) ROTARY MACHINE COMPONENTS AND METHODS OF FABRICATING SUCH COMPONENTS

(75) Inventors: Daniel Edward Wines, Cincinnati, OH (US); Randy Joseph Ketterer, Cincinnati, OH (US); Barbara Ann Link, West Chester, OH (US); Mark Dean Pezzutti, Mason, OH (US); Charles William Carrier, West Chester, OH (US); Terrence Owen Dyer, Cincinnati, OH (US); Richard Gordon Menzies, Eden, UT (US); Andrew John Lammas, Greenville, OH (US)

(73) Assignee: General Electric Company, Schenectady, NY (US)

( * ) Notice: Subject to any disclaimer, the term of this patent is extended or adjusted under 35 U.S.C. 154(b) by 805 days.

(21) Appl. No.: 11/564,070

(22) Filed: Nov. 28, 2006

(65) Prior Publication Data
US 2008/0120842 A1 May 29, 2008

(51) Int. Cl.
*F01D 5/06* (2006.01)
(52) U.S. Cl. .............................. 416/244 A; 415/216.1; 29/889.2
(58) Field of Classification Search ............ 416/244 A, 416/248; 415/216.1; 29/889.2
See application file for complete search history.

(56) References Cited

U.S. PATENT DOCUMENTS

| | | | |
|---|---|---|---|
| 2,922,619 A * | 1/1960 | Slemmons ............... | 416/244 A |
| 3,588,276 A * | 6/1971 | Jubb .......................... | 416/95 |
| 3,835,282 A | 9/1974 | Sass et al. | |
| 4,273,512 A * | 6/1981 | Weiler ..................... | 416/244 A |
| 4,784,572 A * | 11/1988 | Novotny et al. ......... | 416/244 A |
| 4,813,848 A * | 3/1989 | Novotny .................. | 416/244 A |
| 4,820,358 A | 4/1989 | Chang | |
| 5,100,484 A | 3/1992 | Wukusick et al. | |
| 5,106,012 A * | 4/1992 | Hyzak et al. ............... | 29/889.2 |
| 5,312,497 A | 5/1994 | Mathey | |
| 5,527,020 A | 6/1996 | Ganesh et al. | |
| 5,571,345 A | 11/1996 | Ganesh et al. | |
| 6,110,302 A | 8/2000 | Gorman | |
| 6,132,535 A | 10/2000 | Okada et al. | |
| 6,478,896 B1 | 11/2002 | Ganesh et al. | |
| 6,660,110 B1 | 12/2003 | Gayda et al. | |
| 2005/0084381 A1* | 4/2005 | Groh et al. .............. | 416/244 A |
| 2005/0281677 A1* | 12/2005 | James ..................... | 416/244 A |
| 2006/0008352 A1* | 1/2006 | Segletes et al. ......... | 416/244 A |

OTHER PUBLICATIONS

Callister, William D., Materials Science and Engineering: An Introduction, 1996, John Wiley & Sons, Inc., 4$^{th}$ edition, pp. 344-346.*
Lahoti, G.D., Semiatin, S.L., Oh, S.I., Altan, T. and Gegel, H.L., Development of Process Models to Produce a Dual-Property Titanium Alloy Compressor Disk, pp. 23-39.

* cited by examiner

*Primary Examiner*—Richard Edgar
(74) *Attorney, Agent, or Firm*—William Scott Andes, Esq.; Armstrong Teasdale LLP (57) ABSTRACT

A method for fabricating a rotor assembly for a turbine, the turbine including a central rotational axis is provided. The method includes forging a first rotor component from a first material, separately forging a second rotor component from a second material, and coupling the second rotor component to the first rotor component at a location radially inward of the first rotor component. The second rotor component is coupled to the first rotor component in at least one axial-circumferential plane that is at least one of substantially parallel and obliquely oriented with respect to the central rotational axis.

18 Claims, 5 Drawing Sheets

ROTARY MACHINE COMPONENTS AND METHODS OF FABRICATING SUCH COMPONENTS

BACKGROUND OF THE INVENTION

This invention relates generally to rotary machines, and more particularly to methods and apparatus for fabricating components of rotary machines.

At least some known rotary machines such as, but not limited to, steam turbine engines and/or gas turbine engines, include various rotor assemblies such as, but not limited to, a fan, a compressor, and/or turbines that each includes a rotor assembly. At least some known rotor assemblies include components such as, but not limited to, disks, shafts, spools, bladed disks ("blisks"), seals, and/or bladed integrated rings ("blings"). Such components may be subjected to different temperatures depending on an axial position and/or a radial position within the gas turbine engine.

For example, during operation, at least some known gas turbine engines may be subjected to an axial temperature gradient that extends along a central rotational axis of the engine. Generally gas turbine engine components are exposed to lower operating temperatures towards a forward portion of the engine and higher operating temperatures towards an aft portion of the engine. As such, known rotor assemblies and/or rotor components are generally fabricated from materials capable of withstanding an expected maximum temperature at its intended position within the engine. At least some other known gas turbine engines may be subjected to radial temperature gradients that extend generally along radial axes that are perpendicular to a central rotational axis of the engine. Different radial areas of the respective assembly/component are subjected to different temperatures. For example, radially inward portions of such engines are generally exposed to lower operating temperatures than components located relatively radially outward.

To accommodate different temperatures, engine components have been fabricated with different alloys that have different material properties that enable the components to withstand different expected maximum radial and/or axial temperatures. More specifically, known rotary assemblies and/or rotary components are generally forged from a single alloy that is capable of withstanding the expected maximum temperature of the entire rotary assembly and/or rotary component. Because single alloys that are capable of withstanding the expected maximum temperature are generally more expensive and heavier than alloys that are only capable of withstanding lower temperatures, known rotary components forged from the more expensive and heavier single alloys generally increase the overall weight and/or cost of the rotor components as compared to rotary components fabricated from alloys that are only capable of withstanding lower temperatures.

Known forging methods may also require a greater amount of input forging material than is necessary to produce a finished part to facilitate material flow for die fill. Moreover, additional machining time may be required to remove extra material after forging. As such, known forging methods may also increase the overall cost of fabricating the rotor components.

BRIEF DESCRIPTION OF THE INVENTION

In one aspect, a method for fabricating a rotor assembly for a turbine, the turbine including a central rotational axis is provided. The method includes forging a first rotor component from a first material, separately forging a second rotor component from a second material, and coupling the second rotor component to the first rotor component at a location radially inward of the first rotor component. The second rotor component is coupled to the first rotor component in at least one axial-circumferential plane that is at least one of substantially parallel and obliquely oriented with respect to the central rotational axis.

In another aspect, a rotor assembly for a turbine including a central rotational axis is provided. The rotor assembly including a first rotor component forged from a first material and a second rotor component coupled to the first rotor component at a location radially inward of the first rotor component. The second rotor component including a radially outer circumferential web edge. The second rotor component being separately forged from a second material and coupled to the first rotor component in at least one axial-circumferential plane that is at least one of substantially parallel and obliquely oriented with respect to the central rotational axis.

In a further aspect, a rotary machine including a central rotational axis is provided. The rotary machine includes a rim forged from a first material and a disk stage coupled to the rim at a location radially inward of the rim. The disk stage including a radially outer circumferential web edge. The disk stage being separately forged from a second material and coupled to the rim in at least one axial-circumferential plane that is at least one of substantially parallel and obliquely oriented with respect to the central rotational axis.

DETAILED DESCRIPTION OF THE INVENTION

The exemplary methods and apparatus described herein overcome the disadvantages of known assembling methods and rotor components by fabricating and assembling component parts based on a radial temperature gradient of the respective component such that weight and cost of the rotor components are facilitated to be reduced. It should be appreciated that "axial" and "axially" are used throughout this application to reference directions and orientations that are substantially parallel to a central rotational axis of the rotary machine. It should also be appreciated that "axial-circumferential plane" is used throughout this application to reference planes that are substantially parallel to the central rotational axis of the rotary machine. In addition, the terms "radial" and "radially" are used throughout this application to reference directions and orientations that are substantially perpendicular to the "axial" and "axially" disposed features. It should also be appreciated that "radial-circumferential plane" is used throughout this application to reference planes that are orientated substantially perpendicular to the "axial-circumferential plane" and to the central rotational axis of the rotary machine. Moreover, it should be appreciated that "forward" is used throughout this application to refer to directions and positions located upstream and towards an inlet side of a gas turbine engine, and "aft" is used throughout this application to refer to directions and positions located downstream and towards an exhaust side of the gas turbine engine.

Figure 1:
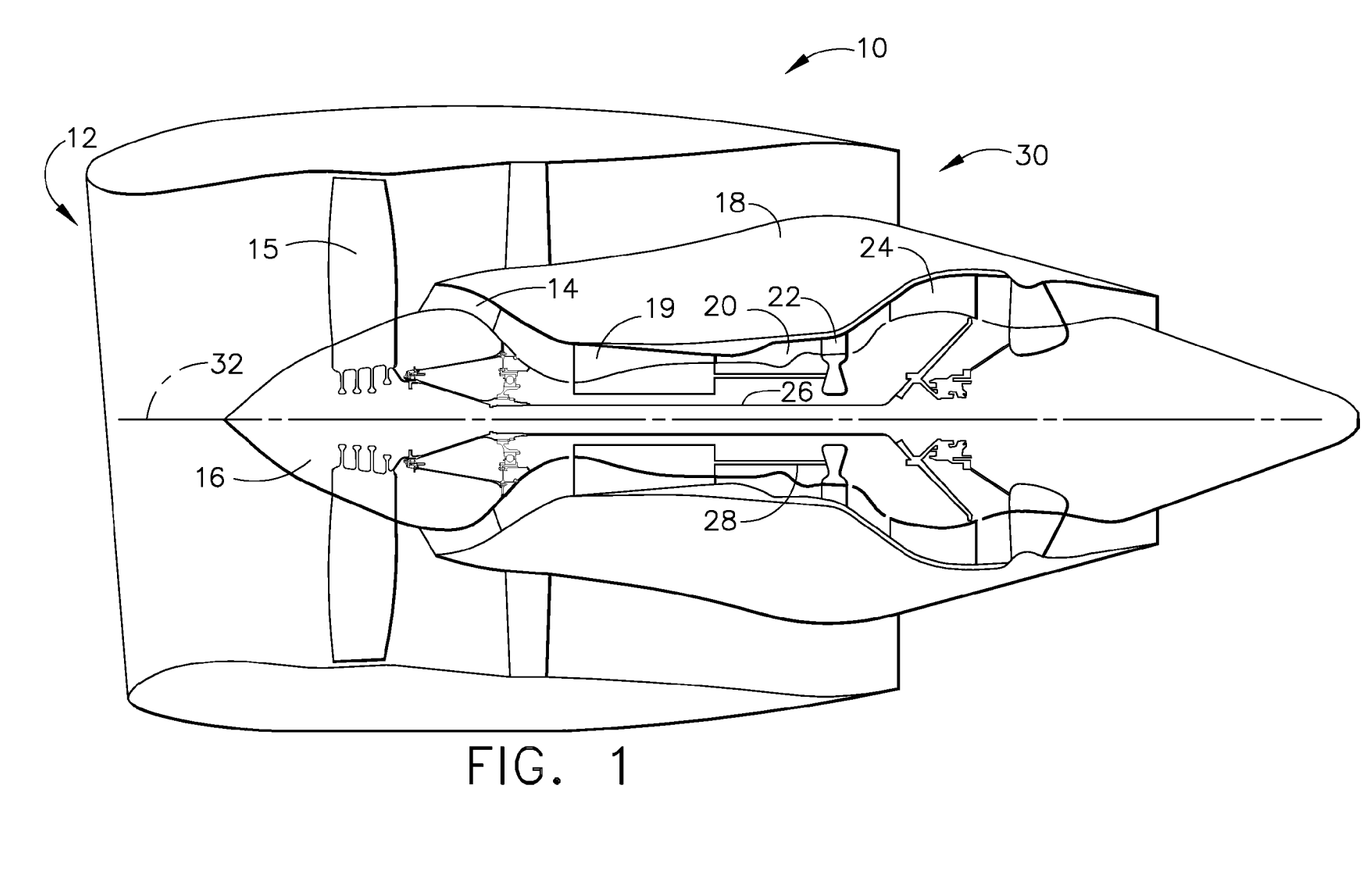
FIG. 1 is a schematic illustration of an exemplary gas turbine engine.

FIG. 1 a schematic illustration of an exemplary gas turbine engine 10 including an air intake side 12, a fan assembly 14, a core engine 18, a high-pressure turbine 22, a low-pressure turbine 24, and an exhaust side 30. Fan assembly 14 includes an array of fan blades 15 extending radially outward from a rotor disc 16. Core engine 18 includes a high-pressure compressor 19 and a combustor 20. Fan assembly 14 and the low-pressure turbine 24 are coupled by a first rotor shaft 26, and the compressor 19 and the high-pressure turbine 22 are coupled by a second rotor shaft 28 such that fan assembly 14, high-pressure compressor 19, high-pressure turbine 22, and low-pressure turbine 24 are in serial flow communication and co-axially aligned with respect to a central rotational axis 32 of gas turbine engine 10. In one embodiment, the gas turbine engine 10 is a GE90 engine commercially available from General Electric Company, Cincinnati, Ohio.

During operation, air enters through intake side 12 and flows through fan assembly 14 to high-pressure compressor 19. Compressed air is delivered to combustor 20. Airflow from combustor 20 drives high-pressure turbine 22 and low-pressure turbine 24 prior to exiting gas turbine engine 10 through exhaust side 30.

High-pressure compressor 19, combustor 20, high-pressure turbine 22, and low-pressure turbine 24 each include at least one rotor assembly. Rotary or rotor assemblies are generally subjected to different temperatures depending on their relative axial position and/or radial position within engine 10 and with respect to central rotational axis 32. For example, in the exemplary embodiment, gas turbine engine 10 has generally lower operating temperatures towards forward fan assembly 14 and higher operating temperatures towards aft high-pressure turbine 22. As such, rotor components within high-pressure turbine 22 are generally fabricated from materials that are capable of withstanding higher temperatures as compared to fabrication materials for rotor components of fan assembly 14.

Figure 2:
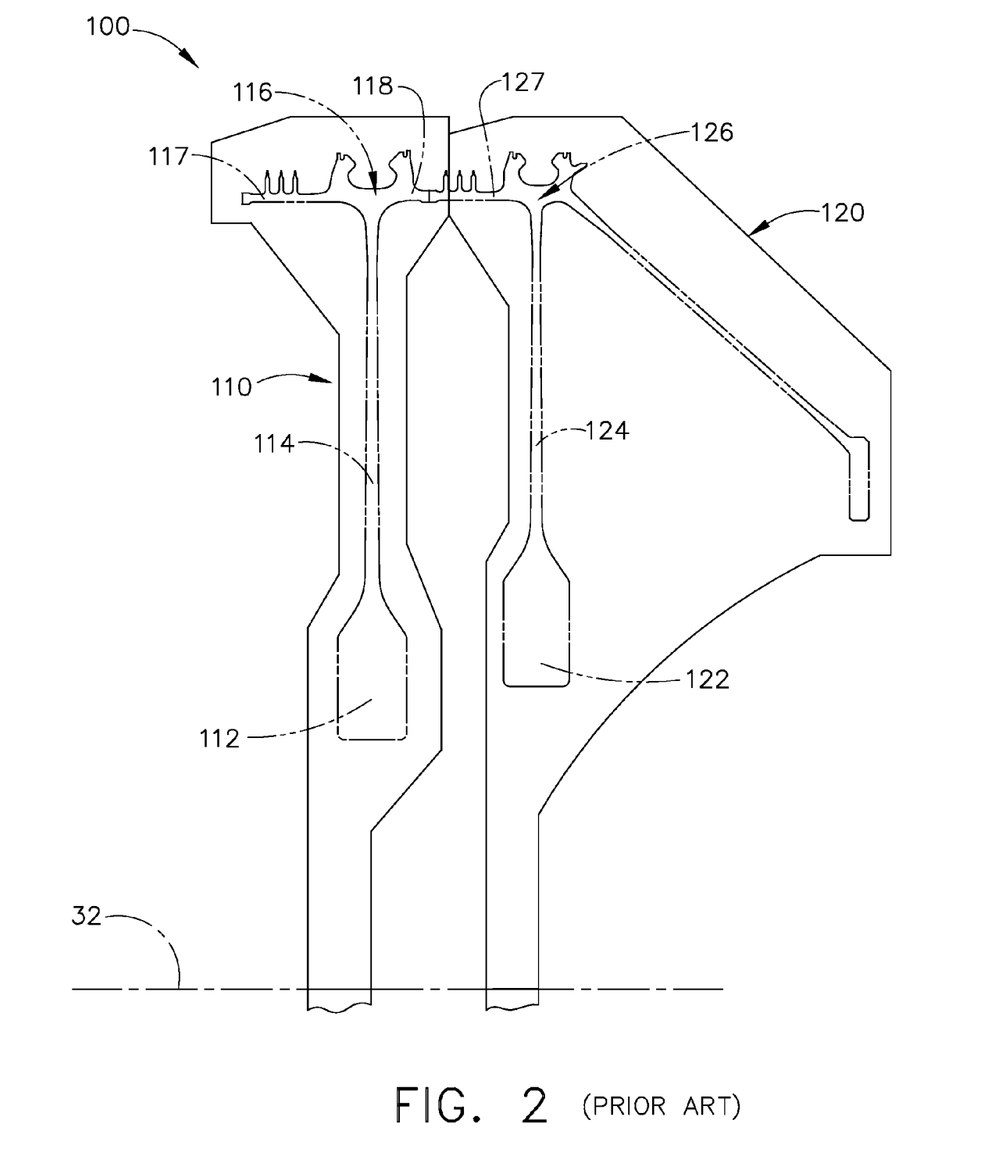
FIG. 2 is a partial side view of an exemplary known rotor assembly that may be used with the gas turbine engine shown in FIG. 1.
Figure 3:
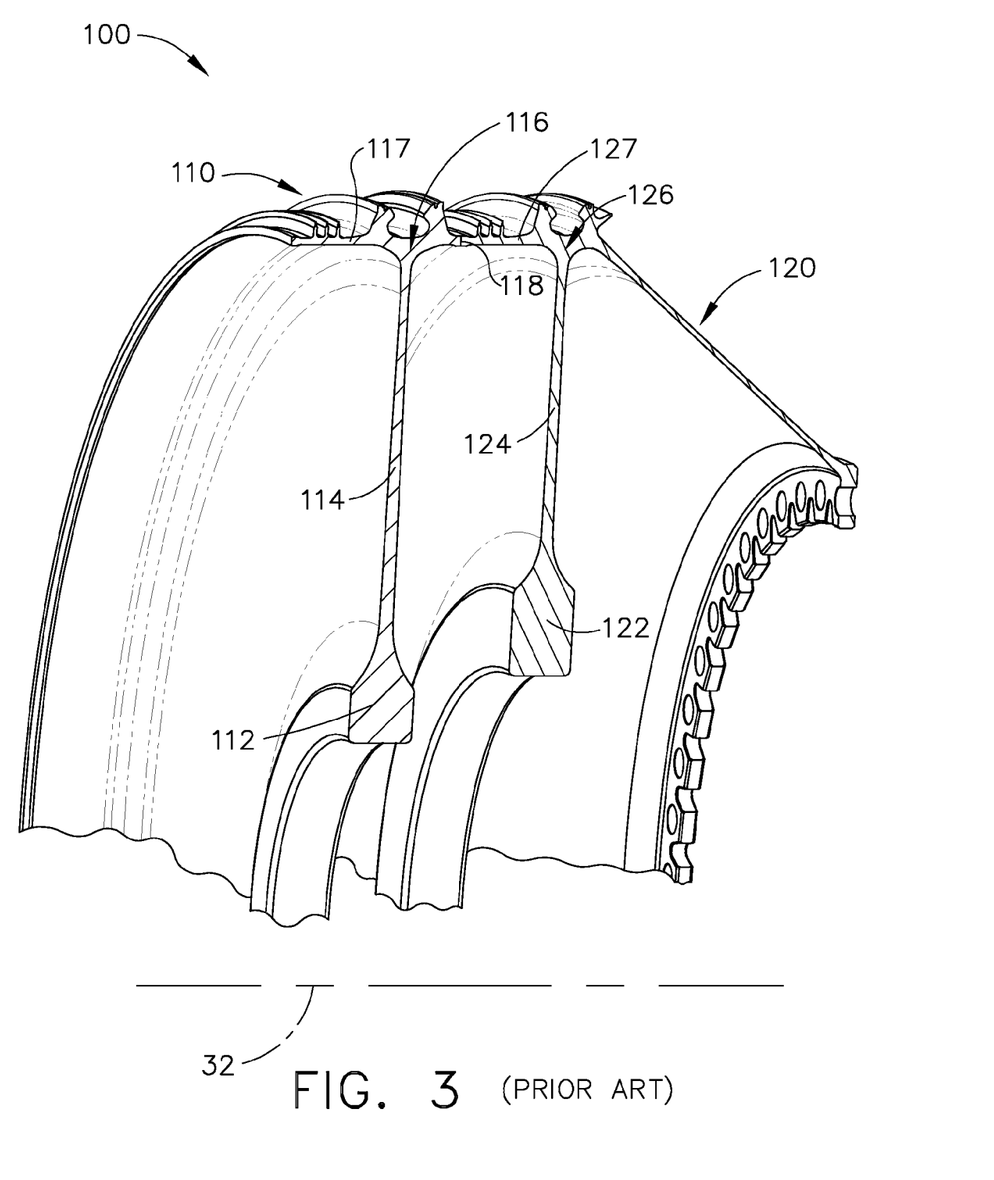
FIG. 3 is a partial perspective view of the rotor assembly shown in FIG. 2.

FIG. 2 is a partial side view of an exemplary known rotor assembly 100 that may be used with a gas turbine engine, such as gas turbine engine 10 (shown in FIG. 1). FIG. 3 is a partial perspective view of rotary assembly 100. In the exemplary embodiment, rotor assembly 100 includes a plurality of rotor disk stages 110 and 120 that are rotatably coupled at different axial positions along a central rotational axis, such as central rotational axis 32 of gas turbine engine 10. Each known disk stage 110 and 120 includes a plurality of component areas that are positioned at different radial positions with respect to central rotational axis 32. Disk stages 110 and 120 are illustrated with respective forging envelopes, which are removed to fabricate final shapes (shown in FIG. 3) of disk stages 110 and 120.

In the exemplary embodiment, components of known rotor assembly 100 are subjected to different temperatures depending on an axial position and/or a radial position with respect to central rotational axis 32. Therefore, each disk stage 110 and 120 is fabricated to include different material properties at different axial positions along central rotational axis 32. For example, forward disk stage 110 is generally fabricated from materials that are capable of withstanding higher temperatures as compared to aft disk stage 120. Moreover, adjacent disk stages 110 and 120 located towards a forward section of gas turbine engine 10 are generally exposed to higher operating temperatures than adjacent disk stages 110 and 120 located toward an aft section of gas turbine engine 10, and as such, are generally fabricated from materials that withstand higher temperatures than materials used in fabricating components downstream.

Although only axial temperature gradients may be considered to determine fabrication materials of known disk stages 110 and 120, radial temperature gradients may also be considered. In the exemplary embodiment, each radial area of each disk stage 110 and 120 may be subjected to a different temperature depending on the radial position of that component. For example, disk stages 110 and 120 each generally include several component areas. More specifically, first disk stage 110 includes a radially inward central bore area 112, a web 114 extending radially outward from bore area 112, and a rim 116 extending radially outward from web 114. Rim 116 includes a forward axial circumferential edge 117 and an opposite aft axial circumferential edge 118. Compared to bore area 112 and web 114, rim 116 is generally exposed and subjected to higher temperatures through heat transferred from rotor blades (not shown) exposed to high temperature steam, combustion gases, or compressed air. Because radially inward bore area 112 and web 114 are generally exposed to lower operating temperatures than radially outward rim 116, bore area 112 and web 114 may be fabricated from materials capable of withstanding lower temperatures as compared to materials used in fabricating rim 116. For example, web 114 and 124 and bore 112 and 122 areas may be fabricated from materials having lower temperature capability.

In the exemplary embodiment, known second disk stage 120 includes a radially inward central bore area 122, a web 124 extending radially outward from the bore area 122, and a rim 126 extending radially outward from web 124. Rim 126 includes a forward axial circumferential edge 127. Compared to bore area 122 and web 124, rim 126 is generally exposed and subjected to higher temperatures through heat transferred from rotor blades (not shown) exposed to steam or combustion gases. Because radially inward bore area 122 and web 124 are generally exposed to lower temperatures than radially outward rim 126, bore area 122 and web 124 may be fabricated from materials capable of withstanding lower temperatures as compared to materials used in fabricating rim 126. For example, rim 116 and 126 areas may be fabricated from materials having creep resistance properties and/or hold time fatigue properties that facilitate reducing crack growth and creep deformation.

As discussed above, different alloys generally have different material properties. Fabricating known disk stages 110 and 120 by limiting a volume of more expensive and heavier alloys may be cost effective. However, known forging methods generally do not facilitate mixing different alloys in a single forging. Therefore, in the exemplary embodiment, known disk stages 110 and 120 are each separately forged from a single alloy composition that is capable of withstanding a maximum radial temperature that may be subjected to each respective rim 116 and 126 as a result of heat transferred via rotor blades.

Moreover, as discussed above, to facilitate die fill, known forging techniques generally require a greater amount of input forging material than is necessary to produce known disk stages 110 and 120. As such, additional machining time may be required to remove extra material after forging. Because alloys that are capable of withstanding higher temperatures are generally more expensive and heavier than alloys capable of withstanding only lower maximum temperatures, known forging methods may actually facilitate increase weight and/or fabrication costs of disk stages 110 and 120. Because known disk stages 110 and 120 are fabricated from alloys that are capable of withstanding higher temperatures than alloys that are only capable of withstanding lower temperatures, known disk stages 110 and 120 are generally more expensive and heavier than the alloys that are capable of only withstanding the lower temperatures. As such, known forging methods may increase the overall weight and/or cost of the rotor components.

Known disk stages 110 and 120 may be subsequently coupled by various known mechanical and/or metallurgical techniques that couple adjacent disk stages 110 and 120 along a radial-circumferential plane that is substantially perpendicular to central rotational axis 32. For example, aft axial circumferential rim edge 118 of first disk stage 110 may be axially welded to the facing forward axial circumferential rim edge 127 of second disk stage 120.

Although known forward disk stage 110 may be fabricated from a single alloy that is the same or different as compared to known aft disk stage 120, known disk stages 110 and 120 are generally still forged from a single alloy that is capable of withstanding the maximum expected radial temperature within its respective stage. Because of the increased amount of input forging material, additional single alloy material may be required. As discussed above, known disk stages 110 and 120 are fabricated from alloys that are capable of withstanding higher temperatures than alloys that are only capable of withstanding lower temperatures, and thus, known disk stages 110 and 120 are generally more expensive and heavier than the alloys that are capable of only withstanding the lower temperatures. As such, the additional alloy material and additional machining time increase the overall weight of the rotor component and the fabrication costs associated with the known rotor component.

Figure 4:
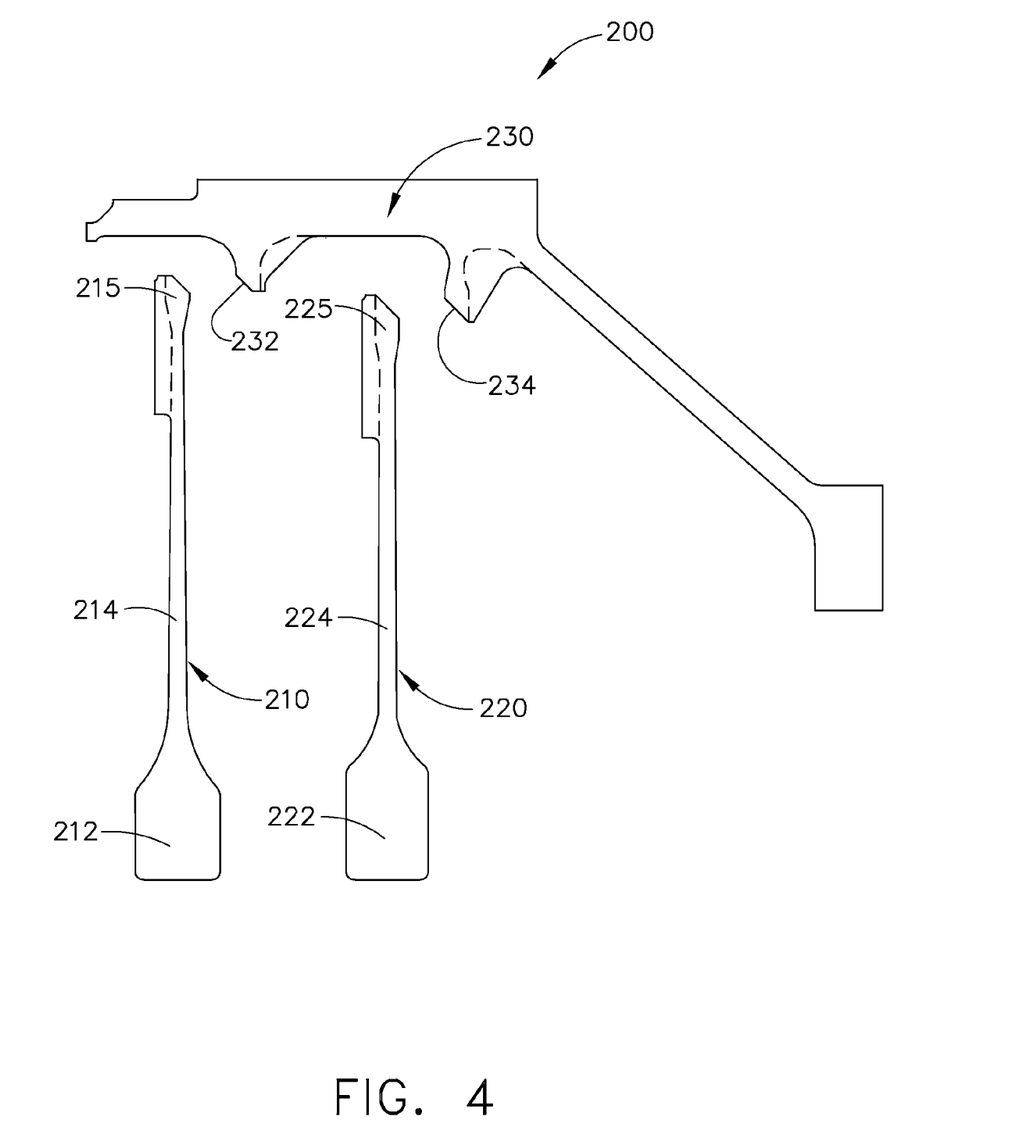
FIG. 4 is a partial side view of an exemplary rotor assembly that may be used with the gas turbine engine shown in FIG. 1.
Figure 5:
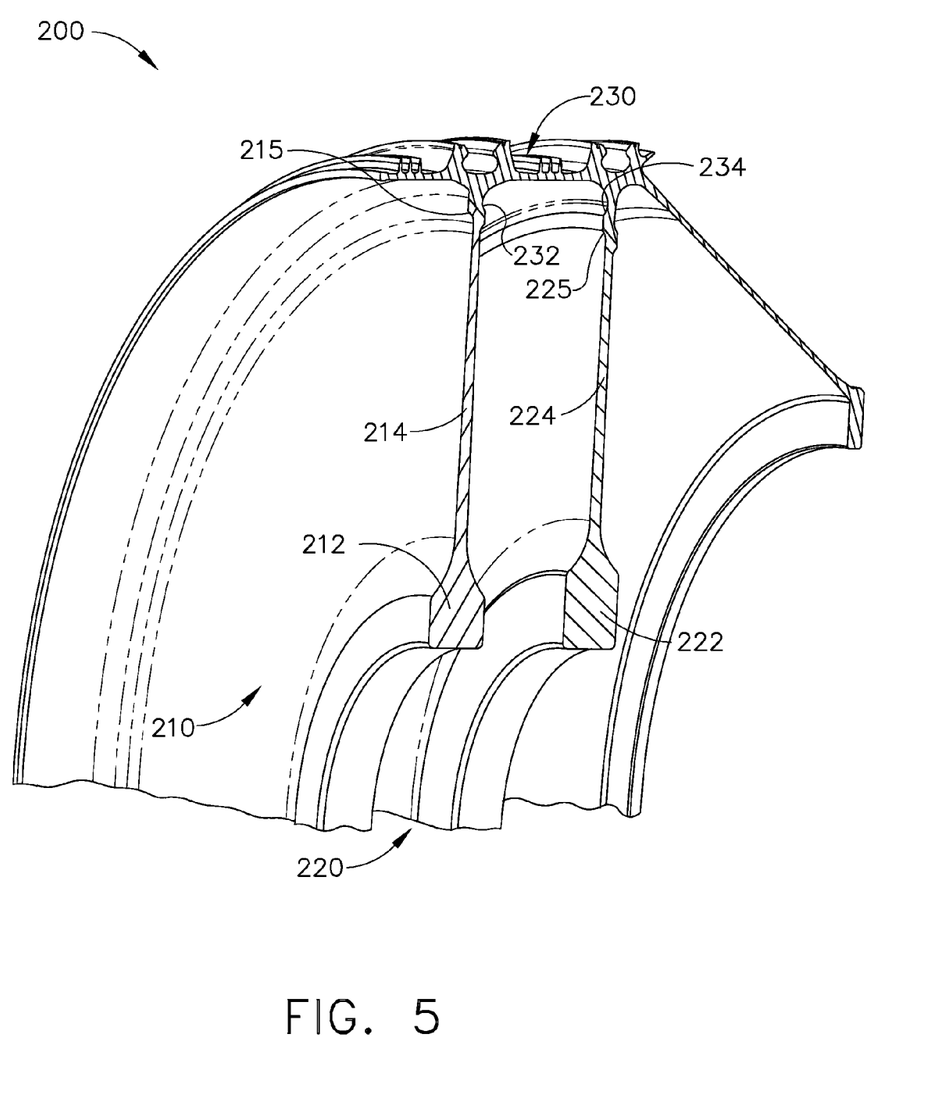
FIG. 5 is a partial perspective view of the rotor component assembly shown in FIG. 4.

FIG. 4 is a partial side view of an exemplary rotor assembly 200 that may be used with a gas turbine engine, such as gas turbine engine 10 (shown in FIG. 1). FIG. 5 is a partial perspective view of rotor assembly 200. In the exemplary embodiments, rotor assembly 200 includes a plurality of rotor disk stages 210 and 220, and a rim 230. Disk stages 210 and 220 are positioned at different axial positions along a central rotational axis, such as central rotational axis 32 (shown in FIGS. 2 and 3) of gas turbine engine 10. Each disk stage 210 and 220 includes a plurality of areas that are positioned at different radial positions with respect to the central rotational axis. Disk stages 210 and 220, and rim 230 are illustrated as in-process shapes (shown in FIG. 4) including excess material portions, which are removed prior to final machining to fabricate final shapes (shown in FIG. 5) of disk stages 210 and 220.

In the exemplary embodiment, portions of rotor assembly 200 are subjected to different operating temperatures depending on the axial position and/or the radial position of those portions with respect to the central rotational axis. Moreover, as described in more detail below, each disk stage 210 and 220 includes different material properties at different axial positions along the central rotational axis. For example, in the exemplary embodiment, forward disk stage 210 is generally fabricated from materials capable of withstanding higher temperatures as compared to aft disk stage 220.

Specifically, in the exemplary embodiment, disk stages 210 and 220 are separately forged from, and joined to, a, rim 230 to facilitate reducing weight and fabrication costs in further consideration of radial temperature gradients. Each disk stage 210 and 220 includes a web and a central bore. More specifically, first disk stage 210 includes bore area 212 and a web 214 that extends radially outward from bore area 212. Web 214 includes an outer circumferential web edge 215.

Radially inward bore area 212 and web 214 are generally exposed to lower operating temperatures than rim 230. As such, compared to materials used in fabricating rim 230, bore area 212 and web 214 are fabricated with materials that have lower temperature capability. Therefore, in a single forging process, first disk stage bore area 212 and web 214 are fabricated from a single alloy composition capable of withstanding a lower temperature as compared to a material capable of withstanding higher temperatures that is used in fabricating rim 230.

In the exemplary embodiment, second disk stage 220 includes a central bore area 222 and a web 224 that extends radially outward from bore area 212. Web 224 includes an outer circumferential web edge 225. Radially inward bore area 222 and web 224 are generally exposed to lower operating temperatures than rim 230. As such, compared to materials used in fabricating rim 230, bore area 222 and web 224 are fabricated with materials that have lower temperature capability. Therefore, in a single forging process, second disk stage bore area 222 and web 224 are fabricated from a single alloy composition that is the same or different than the alloy composition used for bore area 212 and the web 214 of first disk stage 220. However, second disk stage bore area 222 and web 224 are fabricated from a single alloy composition capable of withstanding lower temperatures as compared to a material capable of withstanding higher temperatures that is used in fabricating rim 230.

In the exemplary embodiment, rim 230 includes a plurality of rim protrusions 232 and 234 that extend radially inward. Each protrusion 232 and 234 is positioned at a different axial location relative to the central rotational axis, and is oriented to engage rim circumferential edges 215 and 225 of first and second disk stages 210 and 220, respectively.

Compared to bore areas 212 and 222, and to webs 214 and 224, rim 230 is generally subjected to higher temperatures as a result of heat transfer from rotor blades (not shown) that are generally exposed to high temperature steam or combustion gases. As such, rim 230 is fabricated from materials having creep resistance and hold time fatigue properties that facilitate reducing crack growth and creep deformation. Therefore, in a single forging process, rim 230 is fabricated from a single alloy composition capable of withstanding higher temperatures as compared to the materials used in fabricating bore areas 212 and 222 and webs 214 and 224.

Each of first disk stage 210 and the second disk stage 220 is subsequently joined to rim 230 in an axial-circumferential plane that is at least one of substantially parallel and obliquely oriented with respect to the central rotational axis. For example, first disk stage web edge 215 is radially welded to rim first protrusion 232, and second disk stage web edge 225 is radially welded to rim second protrusion 234. More specifically, in the exemplary embodiment, at least one portion of web edges 215 and 225, and at least one portion of first and second rim protrusions 232 and 234, are preferably at least one of substantially parallel and obliquely oriented at angles of approximately between 0 to 90°, more particularly, approximately 45°, and all subranges therebetween with respect to the central rotational axis. Moreover, in the exemplary embodiment, web edge 215 is shaped generally complementary to first rim protrusion 232, and web edge 225 is complementary to second rim protrusion 234.

In exemplary rotor assembly 200, the amount of generally more expensive and heavier materials previously used in bore and web areas, such as known disk stages 110 and 120 (shown in FIGS. 2 and 3), is reduced because generally materials capable of withstanding only lower temperatures are used in fabricating bore areas 212 and 222 and webs 214 and 224. As a result of using less input forging materials capable of withstanding higher temperatures, the overall weight and fabrication costs associated with bore areas 212 and 222 and webs 214 and 224 of first and second disk stages 210 and 220 may be reduced.

Moreover, in the exemplary embodiments, although disk stages 210 and 220 are coupled to rim 230, rim 230 is a common rim forged separately from higher temperature materials which enables rim 230 to be coupled to a plurality of axially displaced disk stages 210 and 220. As a result, because rim 230 is coupled to axially adjacent disk stages 210 and 220, a plurality of individual rims, such as rims 116 and 126 (shown in FIGS. 2 and 3), do not have to be subsequently welded together within the rotor assembly 200 as is required in known rotor assemblies, such as rotor assembly 100 (shown in FIGS. 2 and 3).

In exemplary methods for fabricating rotor assembly 200, rim 230 is forged separately from disk stages 210 and 220. More specifically, rim 230 is forged from a material that is capable of withstanding higher operating temperatures as compared to materials used to fabricate disk stages 210 and 220. The materials used to forged disk stages 210 and 220 may be the same or a different alloy provided that such materials are capable of withstanding only lower maximum expected temperatures as compared to the materials used to forge rim 230. Disk stages 210 and 220 may then be coupled to rim 230 at any axial position along a central rotational axis of a respective engine. More specifically, in the exemplary embodiment, disk stages 210 and 220 are each coupled to rim 230 in at least one axial-circumferential plane that is at least one of substantially parallel and obliquely oriented with respect to the central rotational axis.

In summary, during operation, the associated gas turbine engine 10 has generally lower operating temperatures towards its central rotational axis as compared to regions located downstream and exposed to the combustion gas flowpath. For example, bore areas 212 and 222 and webs 214 and 224 are generally exposed to lower operating temperatures as compared to rim 216 and 226 areas. Therefore, it is desirable to fabricate a disk stage, such as disk stages 210 and 220, using materials that are capable of withstanding only lower maximum expected temperatures for bore 212 and 222 areas and webs 214 and 224, and using materials that are capable of withstanding higher temperatures for rims 216 and 226. Such a rotor assembly facilitates reducing the overall forging weight and fabrication costs as compared to known rotor assemblies.

Moreover, in the exemplary embodiment, disk bore areas 212 and 222 and webs 214 and 224 are separately forged from rim 230. Specifically, disk bore areas 212 and 222 and webs 214 and 224 are forged from alloys capable of withstanding only lower maximum expected temperatures as compared to rim 230, which is forged separately from an alloy capable of withstanding higher temperatures. Therefore, such fabrication methods facilitate reducing an amount of generally more expensive materials than are required in fabricating known rotor assemblies. Further, separately forging different radial areas of rotor components facilitates fabricating rotor components from a least expensive material that is capable of withstanding a higher maximum radial temperature at an intended radial position. Such separately forged rotary components may be subsequently welded by placing the welds in an axial-circumferential plane of the part. As a result, the above described fabrication methods facilitate reducing the overall forging weight and fabrication cost of the overall rotary assembly.

Although disk bore areas 212 and 222 and webs 214 and 224 are separately forged from alloys capable of withstanding only lower maximum expected temperatures as compared to rim 230, it should be appreciated that disk area 212 and 222 and webs 214 and 224 may be separately forged from rim 230 using a an alloy that is capable of withstanding higher temperatures induced on rim 230. In other words, disk area 212 and 222 and webs 214 and 224 may be forged from a same alloy used to separately forge rim 230. Because rim 230 is separately forged from disk area 212 and 222 and webs 214 and 224, a lesser amount of input forging material facilitates material flow for die fill to produce a final machined rim 230 as compared to known forging methods to produce a final machined rim having substantially the same dimensions. As such, separately forging rim 230 facilitates removing less extra material after forging as compared to known forging methods. As a result, the above described fabrication methods also facilitate reducing the overall forging weight and fabrication cost of the overall rotary assembly as compared to known fabrication methods.

Exemplary embodiments of fabricating and assembling rotor components are described in detail above. The rotor components are not limited to use with the gas turbine engine described herein, but rather, the rotary components can be utilized independently and separately from other rotor assembly components described herein. Moreover, the invention is not limited to the embodiments of the rotor assembly and components described above in detail. Rather, other variations of the rotary assembly and components may be utilized within the spirit and scope of the claims.

While the invention has been described in terms of various specific embodiments, those skilled in the art will recognize that the invention can be practiced with modification within the spirit and scope of the claims.

What is claimed is:

1. A method for fabricating a rotor assembly for a gas turbine engine having a compressor section and a turbine section, the rotor assembly having a central rotational axis, said method comprising:

forging a plurality of rotor disk stages separately from one another, wherein at least one of the disk stages is forged from a first material that is configured to withstand a first maximum operating temperature, wherein the disk stages are part of the turbine section of the gas turbine engine;

forging a rim separately from the disk stages, the rim forged from a second material that is configured to withstand a second maximum operating temperature that is greater than the first maximum operating temperature; and coupling each disk stage to the rim at an axial-circumferential plane that is obliquely oriented with respect to the central rotational axis such that the disk stages are radially inward of the rim with the rim spanning the disk stages.

2. A method according to claim 1 wherein coupling each disk stage to the rim further comprises coupling a radially outer circumferential web edge of each disk stage to the rim at the axial-circumferential plane.

3. A method according to claim 1 further comprising fabricating the rim to include a protrusion that is configured to extend radially inward, wherein a portion of the protrusion is configured to lie on the axial-circumferential plane and to be obliquely oriented with respect to the central rotational axis.

4. A method according to claim 3 wherein coupling each disk stage to the rim further comprises coupling a radially outer circumferential web edge of one of the rotor disk stages to the portion of the protrusion at the axial-circumferential plane.

5. A method according to claim 4 wherein the portion of the protrusion is oriented at an angle between 0° and 90° with respect to the central rotational axis.

6. A method according to claim 4 wherein the radially outer circumferential web edge is oriented at an angle between 0° and 90° with respect to the central rotational axis.

7. A method according to claim 4 wherein the portion of the protrusion and the radially outer circumferential web edge are oriented at complementary angles.

8. A rotor assembly for a gas turbine engine having a compressor section and a turbine section, said rotor assembly having a central rotational axis and comprising:
 a plurality of rotor disk stages forged separately from one another, wherein at least one of said disk stages is forged from a first material that is configured to withstand a first maximum operating temperature, wherein said disk stages are part of the turbine section of the gas turbine engine; and
 a rim forged separately from said disk stages, said rim forged from a second material that is configured to withstand a second maximum operating temperature that is greater than the first maximum operating temperature, wherein each disk stage is coupled to said rim at an axial-circumferential plane that is obliquely oriented with respect to the central rotational axis such that said disk stages are radially inward of said rim with said rim spanning said disk stages.

9. A rotor assembly according to claim 8 wherein each disk stage comprises a radially outer circumferential web edge coupled to said rim at the axial-circumferential plane.

10. A rotor assembly according to claim 8 wherein said rim comprises at least one protrusion that extends radially inward such that a portion of said at least one protrusion lies on the axial-circumferential plane.

11. A rotor assembly according to claim 10 wherein said portion of said protrusion is coupled to a radially outer circumferential web edge of one of said rotor disk stages at the axial-circumferential plane.

12. A rotor assembly according to claim 11 wherein said portion of said protrusion is oriented at an angle between 0° and 90° with respect to the central rotational axis.

13. A rotor assembly according to claim 11 wherein said radially outer circumferential web edge is oriented at an angle between 0° and 90° with respect to the central rotational axis.

14. A rotor assembly according to claim 11 wherein said portion of said protrusion and said radially outer circumferential web edge are oriented at complementary angles.

15. A gas turbine engine comprising:
 a compressor assembly;
 a combustor assembly arranged in flow communication with said compressor assembly; and
 a turbine assembly arranged in flow communication with said combustor assembly, wherein said turbine assembly has a central rotational axis and comprises:
  a plurality of rotor disk stages forged separately from one another, wherein at least one of said disk stages is forged from a first material that is configured to withstand a first maximum operating temperature; and
  a rim forged separately from said disk stages, said rim forged from a second material that is configured to withstand a second maximum operating temperature that is greater than the first maximum operating temperature, wherein each disk stage is coupled to said rim at an axial-circumferential plane that is obliquely oriented with respect to the central rotational axis such that said disk stages are radially inward of said rim with said rim spanning said disk stages.

16. A gas turbine engine according to claim 15 wherein each disk stage comprises a radially outer circumferential web edge coupled to said rim at the axial-circumferential plane.

17. A gas turbine engine according to claim 16 wherein said rim comprises a protrusion that extends radially inward, a portion of said protrusion being obliquely oriented with respect to the central rotational axis.

18. A gas turbine engine according to claim 17 wherein said radially outer circumferential web edge is coupled to said portion of said protrusion at the axial-circumferential plane.

\* \* \* \* \*